Patented Apr. 22, 1941

2,238,902

UNITED STATES PATENT OFFICE 2,238,902

SULPHONIC DERIVATIVES

Morris Katzman and Benjamin R. Harris, Chicago, Ill., assignors to The Emulsol Corporation, Chicago, Ill., a corporation of Illinois No Drawing. Application August 25, 1939, Serial No. 291,898

17 Claims. (Cl. 260—401)

This invention relates to new chemical compounds in the form of amide derivatives of polycarboxylic acid derivatives and to intermediates which are utilized in the preparation of the final products. The compounds of the present invention, which are preferably employed in the form of reaction mixtures, are characterized by interface modifying or capillary properties whereby the same are highly useful for the various purposes described hereinafter.

At least most of the novel compounds of the present invention may be described, in general, as amides of alcohol amines, especially water-soluble amides, with polycarboxylic acids wherein the hydrogen of one or more hydroxy groups of an alcohol amine radical or radicals is replaced preferably by a higher molecular weight lipophile group, and the hydrogen of one or more hydroxy groups of an alcohol amine radical or radicals is replaced by a carboxylic acyl radical of a sulpho-polycarboxylic acid.

In general, the preferred compounds are those which comprise higher molecular weight fatty acid esters of the amides of the alcohol amines with polycarboxylic acids and wherein at least one carboxylic acyl radical of an aliphatic sulphodicarboxylic acid having not more than eight carbon atoms has been introduced into the molecule.

Many of the compounds falling within the scope of the present invention may be represented by the general formula $$X.(Y)_m.(Z)_n.(A)_t$$

wherein X is the residue of a polycarboxylic acid, Y is an alcohol primary or secondary amine radical, preferably at least two carboxyl groups of the polycarboxylic acid being amidified by the alcohol amine, Z is a lipophile radical containing at least six and preferably from ten to eighteen carbon atoms, and A is the radical of a sulpho-polycarboxylic acid. In accordance with said formula, $m$ is one or more but particularly at least 2, and each of $n$ and $t$ are at least one.

The intermediate compounds are also represented by said general formula. Thus, for example, if $n$ is zero, the intermediate compound comprises a sulpho-polycarboxylic acid derivative of the polycarboxylic acid amide whereas, if $t$ is zero, the intermediate compound is a lipophile derivative of the polycarboxylic acid amide.

In view of the fact that the products of the present invention not infrequently comprise mixtures of different chemical compounds and since the products may, in many instances, be employed as such without any purification treatments, we prefer, in certain cases, to describe them as reaction products. Indeed, in certain instances, they may best be defined in such manner. In general, they may be characterized as lipophile derivatives of sulpho-polycarboxylic acid derivatives of amides of polycarboxylic acids with alcohol primary or secondary amines.

In order that the nature of the invention may become apparent, there are listed hereinbelow representative compounds which fall within the scope of the invention:

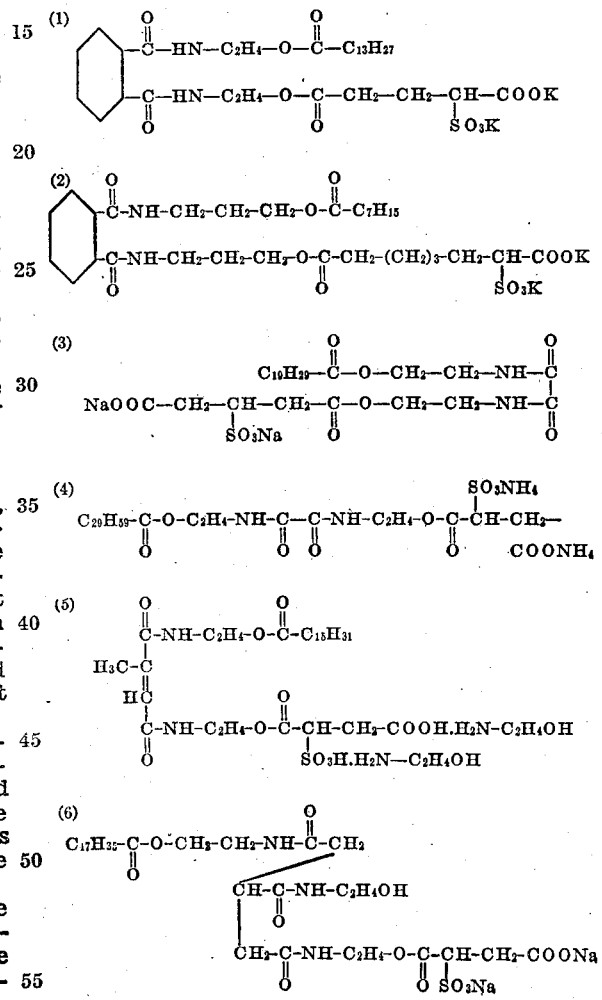

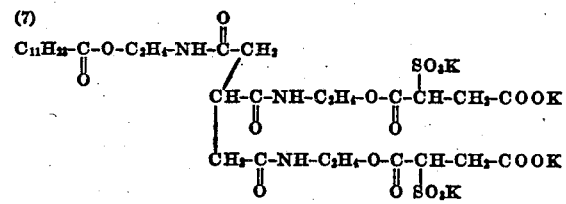

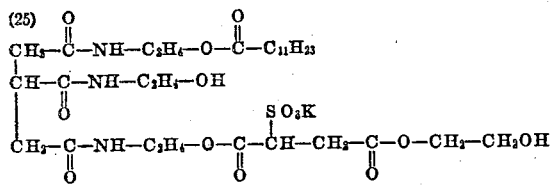
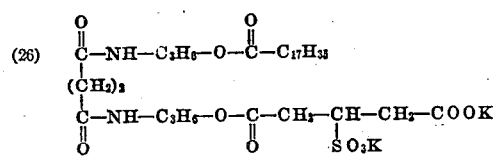
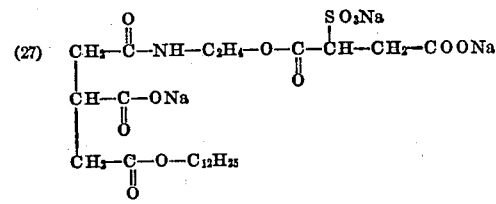
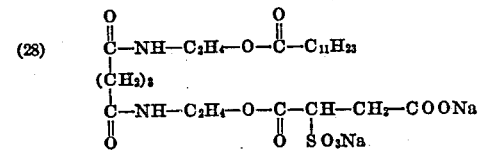
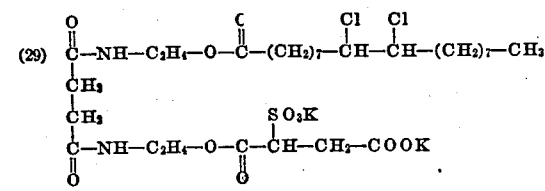
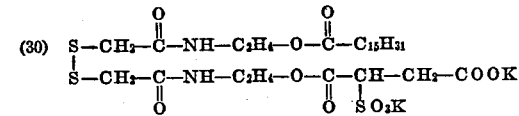
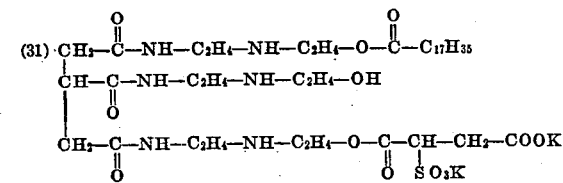
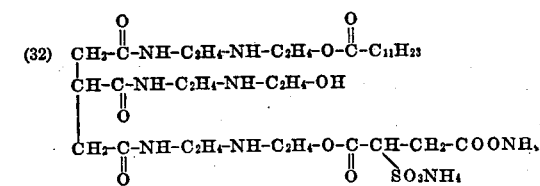
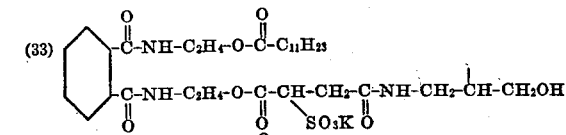
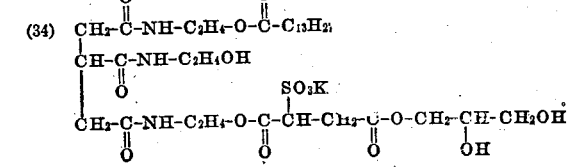

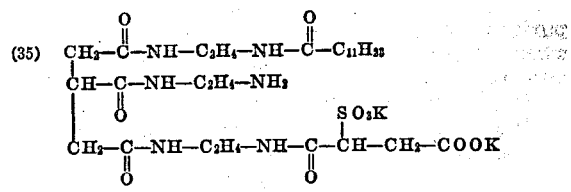
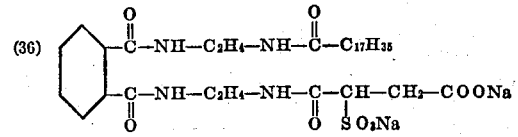
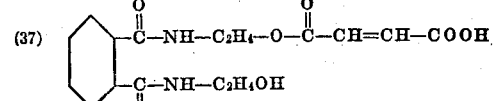
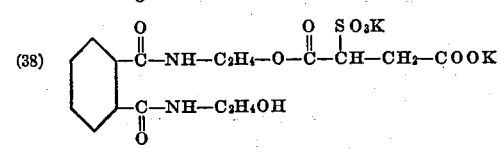
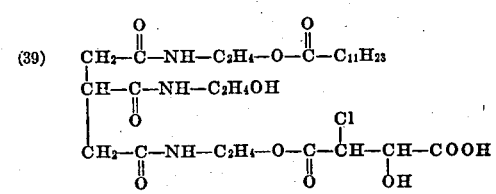
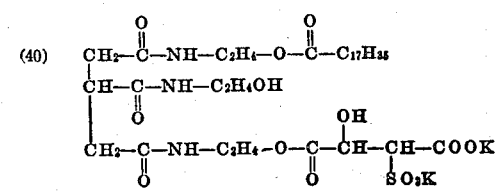

While the above examples represent single substances, it will be understood that, in practice, it is, in general, more advantageous to employ mixtures of any two or more thereof with or without diluents. In many instances, the reaction products may be employed as such.

It will be seen, in the light of the numerous examples set forth hereinabove, that many of the compounds may be considered as water-soluble or water-dispersible amides of polycarboxylic acids which are reacted to introduce at least one lipophile group, by means of a higher molecular weight alcohol, acid, acyl halide, anhydride, ester or the like, and also a sulpho-polycarboxylic acid group. In general, the lipophile and sulpho-polycarboxylic groups are introduced at extremities of the intermediate polycarboxylic acid amide. In certain cases, an intermediate polycarboxylic acid amide, for example, the amide of ammonia and tricarballylic acid, may be treated with alkylene oxides such as ethylene oxide to introduce a chain of ethoxy groups into the molecule. The resulting compound may then be treated to introduce a lipophile group or groups into the molecule with or without a sulpho-polycarboxylic acid radical or radicals.

The following examples are illustrative of methods which have been found suitable for preparing various of the compounds which are disclosed herein. It will be appreciated that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

*Example A*

(1) 49.4 grams of monoethanolamine were added slowly, at room temperature and with stirring, to 58.6 grams of the diethyl ester of oxalic acid. After the addition of the monoethanolamine was completed, the mixture was heated to 170 degrees C. to complete the reaction. The reaction product was an ivory-colored, crystalline-like substance having a high melting point.

(2) 53.7 grams of the reaction product of part (1) hereof and 50 grams of lauric acid were heated together for about one hour at 170 degrees C. to 230 degrees C. at the end of which time the free fatty acids were reduced below 1%.

(3) 36 grams of the reaction product of part (2) hereof were melted and heated to 120 degrees C.–130 degrees C. and there were added thereto, with stirring, 11 grams of maleic anhydride. The temperature of the mass was then raised to 145 degrees C. and it was maintained at that temperature for about 5 minutes.

(4) 12 grams of the reaction product of part (3) hereof, 4 grams of sodium sulphite, and 20 cc. of water were heated to 60 degrees C., with stirring, and maintained at that temperature for about 10 minutes. The reaction mass was then diluted with 70 cc. of water and 4 cc. of a 1.5 N sodium hydroxide solution were added to neutralize the product to litmus. The reaction product, which had foaming and wetting properties, contained a substantial proportion of a compound having the following probable formula:

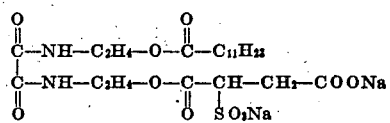

*Example B*

(1) 23.5 grams of the reaction product of part (2) of Example A hereinabove and 100 grams of a 5.5% aqueous solution of sodium hypochlorite were mixed together in an ice bath and were maintained therein for a period of two hours, with stirring. 4 grams of sodium sulphite were then added to destroy the excess sodium hypochlorite. 5 cc. of concentrated hydrochloric acid were then added and the mass was evaporated to dryness in vacuo on a hot water bath. The resulting product was then extracted with 100 cc. of ethyl ether, a small amount of anhydrous sodium sulphate was added to dry the product, the mass was filtered and ether was evaporated from the filtrate.

(2) 10 grams of the residue resulting from the evaporation of the ether filtrate of part (1) hereof, 4 grams of potassium sulphite, and 20 cc. of water were mixed together and heated for a period of 2 hours, with stirring, and at a temperature of 70 degrees C.–80 degrees C. The resulting product, which had foaming and wetting properties, contained a substantial proportion of a compound having the following probable formula:

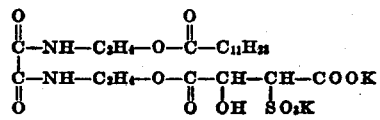

*Example C*

(1) 38.8 grams of dimethyl phthalate and 25.2 grams of monoethanolamine were heated together for about 45 minutes at 160 degrees C. to 190 degrees C. The substantial completion of the reaction is evidenced by measuring the loss of weight due to evolution of methyl alcohol and by determining the titratable alkalinity. The reaction product obtained was an amber, resin-like material at room temperature and was freely water soluble.

(2) To the reaction product obtained in part (1) hereof 35 grams of lauric acid were added and the reaction mixture was heated for one hour at a temperature of 180 degrees C. to 220 degrees C. while passing a stream of carbon dioxide gas through the mixture. When the free fatty acids present were about 1% or less, the reaction was considered complete.

(3) 10 grams of the reaction product of part (2) hereof, and 2.7 grams of maleic anhydride were heated at 100 degrees C. for a period of 10 minutes, with stirring.

(4) The reaction product of part (3) hereof was cooled to 40 degrees C., 25 cc. of water and 3.8 grams of sodium sulphite were added thereto and the resulting mixture was heated for about 10 minutes at 60 degrees C.–70 degrees C., with stirring. The resulting clear solution, which had foaming and wetting properties, contained a substantial proportion of a compound having the following probable formula:

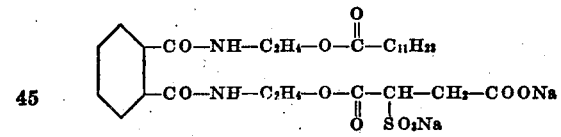

*Example D*

(1) 19.4 grams of dimethyl phthalate and 21 grams of hydroxyethyl ethylenediamine were heated together, with stirring, at a temperature of 180 degrees C.–190 degrees C. for about 2 hours or until approximately 6.5 grams of methyl alcohol were driven off.

(2) The reaction product of part (1) hereof was cooled to 90 degrees C. and 50 cc. of dry dioxane were added thereto. To the resulting mixture, 10 grams of maleic anhydride were added and the resulting mass was stirred and heated to 125 degrees C. and held at that temperature for about 10 minutes.

(3) The reaction product of part (2) hereof was cooled to 70 degrees C. and dissolved in 100 cc. of water. There were then added thereto, dropwise and with stirring, 30 grams of stearoyl chloride and simultaneously there was added dropwise a solution of 4 grams of sodium hydroxide and 50 cc. of water. During the addition of the stearoyl chloride and the sodium hydroxide solution, which was made over a period of about 30 minutes, the mass was maintained in a cold water bath. After the reaction was completed, just enough sodium hydroxide solution was added to render the product neutral to phenolphthalein.

(4) To the reaction product of part (3) hereof 20 grams of sodium bisulphite were added and the mixture was stirred and heated at 60-70 degrees C. for approximately 20 minutes. The reaction product, which had foaming and wetting properties, contained a substantial proportion of a compound having the following probable formula:

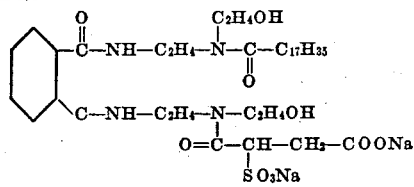

Example E (1) 14 grams of dimethyl phthalate and 21 grams of diethanolamine were heated, with stirring, at 180 degrees C.-190 degrees C. for about one hour or until approximately 6.5 grams of methyl alcohol were driven off.

(2) The reaction mass of part (1) hereof was cooled to room temperature, 50 cc. of pyridine were added thereto, and there were then added dropwise and with stirring, while maintaining the temperature of the reaction mixture at from 10 degrees C. to 20 degrees C. in a cold water bath, 22 grams of lauroyl chloride. After the addition was completed, the mass was warmed to 50 degrees C. and maintained at that temperature for about ½ hour.

(3) 50 grams of the reaction product of part (2) hereof were mixed with 11.4 grams of sulphophthalic acid anhydride and the mass was stirred and heated for approximately 10 minutes at 70 degrees C.-80 degrees C. The reaction product was then dissolved in 100 cc. of water and neutralized with approximately 6.5 grams of monoethanolamine so as to render the product substantially neutral to litmus. The reaction mixture, which had foaming and wetting properties, contained a substantial proportion of a compound having the following probable formula:

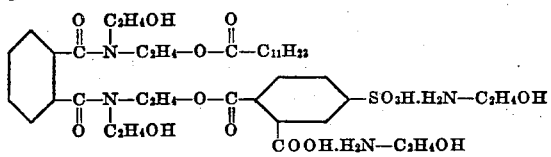

(4) 50 grams of the reaction product of part (2) hereof and 9 grams of sulpho maleic anhydride were heated at 80 degrees C., with stirring, for about 10 minutes. The reaction mixture was then cooled to room temperature, dissolved in 100 cc. of water and neutralized with triethanolamine to render the product just neutral to litmus. The reaction mixture, which had foaming and wetting properties, contained a substantial proportion of a compound having the following probable formula:

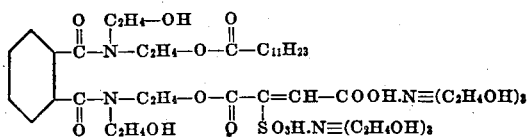

Example F (1) 52 grams of triethyl tricarballylate and 37.5 grams of monoethanolamine were heated for about 3 hours at a temperature ranging from 100 degrees C. to 175 degrees C. until the loss in weight and loss in alkalinity indicated that the reaction was substantially completed. The resulting reaction product was a buff-colored solid which solidified at a temperature of about 135 degrees C. to 150 degrees C.

(2) To the reaction product obtained in part (1) 30 grams of lauric acid were added and the mixture was then heated for one hour at a temperature of 220 degrees C. to 235 degrees C. until the content of free fatty acids was very low. The product obtained was a reddish liquid when hot which solidified into a reddish brown solid. The color of the reaction product may be improved by carrying out the reaction in the absence of air or in an inert atmosphere. The reaction product exhibited foaming and wetting properties. It contained a substantial proportion of a compound having the formula:

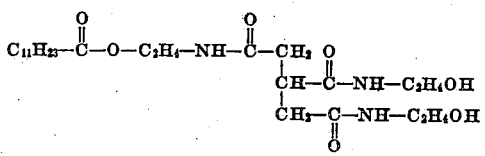

(3) 30 grams of the reaction product of part (2) hereof and 17 grams of aconitic anhydride were heated at 100 degrees C., with stirring, for 10 minutes. The resulting reaction product was dissolved in 50 cc. of cold water, 25 grams of potassium meta-bisulphite (K₂S₂O₅) were added, and the mixture was heated for 10 minutes, with stirring, at 60-70 degrees C. The reaction mixture was then cooled down to 25 degrees C. and an aqueous solution of potassium hydroxide was added in an amount sufficient to make the product just neutral to litmus. The reaction mixture, which had foaming and wetting properties, contained a substantial proportion of a compound having the following probable formula:

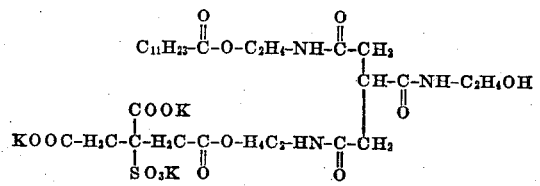

Example G 30.5 grams of the reaction product of part (2) of Example F hereinabove were dissolved in 50 cc. of dry dioxane, 46 grams of sulpho phthalic acid anhydride were added thereto and the mixture was heated, with stirring, at 60-70 degrees C. for approximately 10 minutes. The reaction mass was then cooled to room temperature, dissolved in 100 cc. of water and neutralized with 27 cc. of concentrated ammonia. The final product, which had foaming and wetting properties, contained a substantial proportion of a compound having the following probable formula:

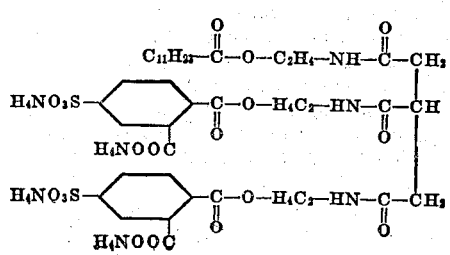

It is, of course, clear that methods other than those described hereinabove may be employed for producing the novel compounds of this invention. Furthermore, the order of reacting the ingredients may be modified as will be apparent to those skilled in the art.

Instead of reacting the amide of the alkylolamine and the polycarboxylic acid first with the higher fatty acid or the like and then introducing the sulpho-polycarboxylic acid radical, said sulpho-polycarboxylic acid radical may be initially introduced into the amide and then the lipophile group may be introduced by reacting with a higher fatty acid acyl halide or other derivative.

Again, the amides of the alkylolamines with the poly-carboxylic acids may be reacted with a halogeno-poly-carboxylic acid halide such as chlor succinyl chloride or brom succinyl bromide in such proportions as to esterify one or more hydroxy groups and then with a salt of sulphurous acid such as an alkali metal sulphite to replace the halogen of the poly-carboxylic acid radical with a sulphonic group or groups. The resulting compound may then be isolated and purified or reacted in the impure state, but in the dry form, with an equivalent amount of a long chain or higher molecular weight acyl halide to esterify the remaining free hydroxy group or groups attached to the alcohol amine radical of the amide.

Alternatively, as previously indicated, the amides of the alcohol amines and the polycarboxylic acids may be reacted with an unsaturated polycarboxylic acid or anhydride, such as maleic acid, maleic anhydride, or fumaric acid. The resulting compound, in this case ester, may then be reacted with sodium or potassium bisulphite to introduce a sulphonic group at the double bond of the maleic acid or fumaric acid radical. Alternatively, instead of reacting with an alkali metal bisulphite, halogen may be introduced into the polycarboxylic acid radical of the compound at a double bond thereof by means of a halogen acid or hypohalogen acid such as hydrochloric acid, hydrobromic acid, hypochlorous acid, hypobromous acid or the like, or by chlorine or bromine directly, and the resulting compound may be treated with an alkali metal sulphite or the like to substitute the halogen by a sulphonic acid radical or radicals. Again, the sulpho-polycarboxylic acid radical or radicals may be introduced into the molecule by reaction with a sulpho-polycarboxylic acid anhydride such as sulpho-succinic anhydride, sulpho-phthalic anhydride, and the like.

In certain instances, as indicated, by way of illustration, in Examples 17 and 19, a free carboxyl group may be present in the compounds. Such compounds may be further reacted to esterify or amidify the free carboxyl group to convert the same into the groups —CONH$_2$, —CONHR, and COOR, as indicated by Examples 24, 25, 33 and 34, where R is preferably lower molecular weight alkyl or cycloalkyl such as ethyl, butyl, cyclohexyl, and the like, which may contain substituent groups such as halogeno, hydroxy, amino, cyanogen and the like. In the case of the ester linkage, that is, the —COOR group, the radical R may be that of a polyhydric alcohol or polyhydroxy substance such as glycerol, glycols, and polyglycols such as ethylene glycol, polyglycerols, and the like. Such derivatives have particularly desirable properties in the technical and industrial arts. The usual amidification and esterification procedures can readily be adapted by the skilled chemist to the preparation of such derivatives.

While the present invention is, in the main, concerned with derivatives of amides of polycarboxylic acids with alcohol primary or secondary amines, it also encompasses in its broader aspects derivatives of amides of polycarboxylic acids with non-hydroxy polyamines. Illustrative of such compounds are Examples 35 and 36 set forth in the list hereinabove. In general, the derivatives of the alcohol primary and secondary amines are more particularly satisfactory.

The polycarboxylic acids from which the amides are derived or prepared or from the esters of which the amides are prepared may be selected from a large group including aliphatic, cyclo-aliphatic, aromatic, araliphatic, and hydroaromatic, saturated and unsaturated, among which may be mentioned oxalic acid, malonic acid, succinic acid, glutaric acid, adipic acid, pimelic acid, suberic acid, azelaic acid, sebacic acid, brassilic acid, methylene malonic acid, alkylidene malonic acid, maleic acid, fumaric acid, citraconic acid, mesaconic acid, itaconic acid, dimethyl maleic acid, ethyl maleic acid, methyl ethyl maleic acid, glutaconic acid, muconic acid, acetylene dicarboxylic acid, tartronic acid, malic acid, citra malic acid, tartaric acid, dihydroxy tartaric acid, tetrahydroxy adipic acid, aconitic acid, hydroxy methyl succinic acid, mucic acid, saccharic acid, the mono- and polyhydroxy derivatives of pimelic, suberic, azelaic and sebacic acids, and the like and substitution derivatives thereof. These acids may be used as such or in the form of their acyl halides, anhydrides or esters, namely, the lower molecular weight esters such as the methyl and ethyl esters thereof or in other forms suitable for amidification. While the free acids may be employed for reaction with the alcohol primary or secondary amines to produce the amides thereof, it is preferred to utilize the ethyl or methyl esters of the polycarboxylic acids in the reaction with the alcohol primary or secondary amines since lower reaction temperatures may be employed with resultant better color of the intermediate amide products. In certain cases, the polycarboxylic acids or the esters thereof also contain other substituents such as CN, NH$_2$, NO$_2$, F, Cl, Br, I, SO$_3$H, SCN, phosphate, sulphate, etc. It is preferred to employ dicarboxylic acids in the form of their ethyl esters.

The alcohol primary and secondary amines or alkylolamines which are reacted with the polycarboxylic acid or derivatives thereof to produce the intermediate amides include, among others, by way of example, monoethanolamine, diethanolamine, monopropanolamine, dipropanolamine, monoethyl ethanolamine, monobutyl ethanolamine, monobutanolamine, mono-isobutanolamine, dibutanolamine, mono-pentanolamine, dipentanolamine, mono-hexanolamine, dihexanolamine, mono-decylolamine, mono-laurylolamine, mono-hexadecylolamine, mono-octadecylolamine, mono- and di-hydroxy polyamines derived, for example, from ethylene diamine, diethylene, triamine, triethylene tetra-amine and the like; mono- and poly-amines of sugars and sugar alcohols such as dextrose, sucrose, sorbitol, mannitol and dulcitol, and amines of polyhydric alcohols in general such as glycerol mono- and di-amine; cyclic hydroxy amines including, for example, p-amino phenol,

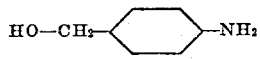

and the like;

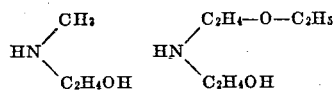

monocyclohexyl, beta - hydroxyethyl amine; N-beta-hydroxylethyl aniline; 1-amino-propanediol-2,3; $H_2N—C_2H_4—S—C_2H_4OH$,

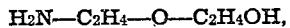

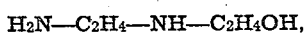

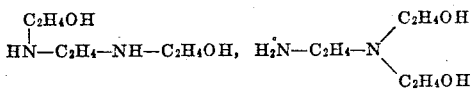

and the like.

The lipophile group or groups which are introduced into the molecule may be derived from various sources among which may be mentioned, by way of example, straight chain and branched chain higher molecular weight carboxylic, aliphatic and fatty acids, saturated and unsaturated, such as caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as i-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicylic acid; hydroxy benzoic and naphthoic acids, and the like; polymerized fatty acids; acyloxy carboxylic acids such as

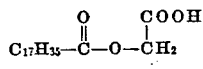

and the like; and substitution and addition derivatives, particularly halogen substitution and addition derivatives of the aforementioned carboxylic substances. It will be understood that mixtures of any two or more of said acids may be employed if desired. The higher fatty acids may be utilized as such or in the form of derivatives thereof such as carboxylic acyl halides, esters and the like.

In those cases where higher molecular weight ethers of the amides of the polycarboxylic acids are prepared, the higher molecular weight organic radical may be derived from alcoholates from alcohols corresponding to the higher molecular weight acids referred to hereinabove.

The sulpho-polycarboxylic acid radicals present in the compounds of this invention may be selected from a relatively large group including, for example, those of sulpho-succinic acid, sulpho-maleic acid, sulpho-glutaric acid and similar sulphonic derivatives of maleic acid, citraconic acid, mesaconic acid, itaconic acid, mucic acid, adipic acid, sebacic acid, suberic acid, azelaic acid, aconitic acid, phthalic acids, and the like. The sulpho-polycarboxylic acid radicals may, in certain instances, contain substituent groups such as halogen, amino, cyanogen, hydroxy and the like but, in general, the best results are obtained when the sulpho-polycarboxylic acid radical is otherwise unsubstituted, is aliphatic di-basic, and contains not more than eight carbon atoms. Of particular utility are the derivatives of sulpho maleic acid, sulpho succinic acid and sulpho phthalic acid.

Where the sulpho-polycarboxylic acid radical is introduced into the molecule through an intermediate reaction with unsaturated polycarboxylic acids, their anhydrides and esters, or halogeno-polycarboxylic acids or other derivatives thereof, which are reacted with the amides of the alcohol amines and polycarboxylic acids, said compounds may be selected from a relatively large class including aliphatic and aromatic compounds such as, for example, maleic acid, maleic anhydride, ethyl maleate, fumaric acid, mono-chlor succinyl chloride, di-chlor succinyl chloride, mono-chlor succinic acid, di-chlor succinic acid, ethyl chlorsuccinate, di-chlor glutaryl chloride, and the corresponding derivatives of malonic acid, citraconic acid, mesaconic acid, itaconic acid, mucic acid, adipic acid, pimelic acid, sebacic acid, suberic acid, azelaic acid, aconitic acid, phthalic acids, and the like. Of particular utility are maleic acid, fumaric acid, ethyl maleate, and maleic anhydride.

The reaction products may be used as such or they may be neutralized, in whole or in part, with suitable anti-acid materials. In this connection, considerable latitude and modification may be exercised. In general, inorganic as well as organic anti-acid agents may be employed. Examples of such agents which may be used satisfactorily are bicarbonates of the alkali metals, potassium hydroxide, potassium carbonate, metallic sodium, sodium hydroxide, sodium oxide, sodium carbonate, ammonium hydroxide, ammonia gas, calcium, magnesium, ammonium, and zinc oxides, hydroxides, and salts, potassium stearate, sodium stearate, and the like; organic nitrogenous bases such as primary, secondary and tertiary amines including alcohol-, alkylol-, and aralkylol-amines, including monoethanolamine, diethanolamine, triethanolamine, propanolamines, butanolamines, pentanolamines, hexanolamines, glycerolamines, sugar alkylolamines and sugar alcohol alkylolamines such as those of dextrose, sucrose, sorbitol, mannitol and the like; dimethyl monoethanolamine, diethyl monoethanolamine, dibutyl mono-ethanolamine, diethanol methyl amine, diethanol ethyl amine, diethanol butanol amine, cyclohexyl ethanolamine, diethanol cyclohexylamine, ethanol aniline, alkylol polyamines such as alkylol derivatives of ethylene diamine, mono-methyl mono-ethanolamine, diethyl monoethanolamine, 1-amino-2, 3-propanediol, 1,2-diamino-propanol; alkylamines such as ethylamine, propylamine, laurylamine, cetylamine, butylamine, hexylamine, cyclohexylamine, aniline, toluidines, dimethylamine, diethylamine, N-methyl-N-ethyl amine, triethylamine, trimethylamine, ethylene diamine, diethylene triamine, triethylene tetra-amine, betaine, monomethyl ethylene diamine, monoethyl diethylene tetra-amine, mono-allyl amine, hydrazine and substituted hydrazine; aromatic and heterocyclic bases and cyclic nitrogenous substances such as benzylamine, cyclohexylethyl aniline, morpholine, pyridine, dimethylaniline, N-methyl-N-benzyl amine, N-ethyl-N-naphthyl amine, quinoline, quinaldine, piperidine, alkyl pyridines such as methylpyridine, pyrrolidines, nicotine, and homologues and derivatives or substitution products thereof, and, in general, primary, secondary and tertiary amines substituted or not with other radicals, such as hydroxy, alkyl, aryl, cycloalkyl groups and the like; quaternary ammonium bases or hydroxides such as tetra-methyl ammonium hydroxide, tetra-ethyl ammonium hydroxide, quaternary ammonium bases with dissimilar alkyl radicals such as methyl-triethyl ammonium hydroxide, propyl trimethyl ammonium hydroxide; mixtures of any two or more of said bases as, for example, in the case of commercial triethanolamine which contains minor proportions of mono- and di-ethanolamine; proteins and partial digestion or hydrolysis products thereof. It will be understood that these substituted ammonium compounds or organic nitrogenous bases may be utilized in pure, impure, or commercial form.

It will be understood that by the term "cation", as used throughout the specification and claims, is meant hydrogen and such other elements as are mentioned herein, and, in general, atoms or radicals which are regarded as bearing a positive charge or capable of replacing acidic hydrogen. The reaction products may be neutralized to methyl orange, litmus or phenolphthalein or to any desired hydrogen ion concentration. As a general rule, if the salts of the reaction products are employed, it is preferred to use the sodium, potassium, ammonium, alkylolamine, or other soluble salts.

It will be understood that the term "lipophile group", as used herein, includes groups having a definite affinity for oils and fats and comprises, for example, alkyl, aralkyl, aryl, ether or ester groups containing preferably at least eight carbon atoms. The lipophile group possesses predominantly hydrocarbon characteristics and, in general, is derived from triglyceride fats and oils, waxes, mineral oils, other hydrocarbons, and the like.

The compounds of our invention have utility in various arts in which interface modifying agents are employed. Many of them are resistant to precipitation by calcium and magnesium salts and are compatible with acid and alkali media. They may, in general, be utilized in washing and laundering and in the textile and related industries wherein they function for wetting, lathering, detergent, emulsifying, penetrating, softening, finishing, dispersing, frothing and foaming purposes. The textiles, various treatments of which in the presence of the agents of the present invention is rendered effective, comprise natural products such as cotton, wool, linen and the like as well as the artificially produced fibres, (and fabrics) such as rayon, cellulose acetates, cellulose ethers and similar artificial silk fabrics and silk and wool substitutes. It will be understood, of course, that the agents may be used in aqueous and other media either alone or in combination with other suitable salts of organic or inorganic character or with other interface modifying agents. In the dyeing of textiles many of them may be employed as assistants in order to bring about even level shades. Many of them also may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of hair washes and hair shampoos, dentifrices of liquid, cream and powder type, cosmetic creams such as cold creams, vanishing creams, tissue creams, shaving creams of the brushless and lathering type and similar cosmetic preparations. Another use to which many of the agents of our invention may be placed is for the treatment of paper or paper pulp or the like. Their capillary or interfacial tension reducing properties enables them to be employed in the fruit and vegetable industry in order to effect the removal from fruits and the like of arsenical and similar sprays. They possess utility in the ore dressing industry wherein they function effectively in froth flotation and agglomeration processes. Their interface modifying properties also permit their use in lubricating oils and the like enabling the production of effective boring oils, cutting oils, drilling oils, wire drawing oils, extreme pressure lubricants and the like. Many of them may also be used with effect in the preparation of metal and furniture polishes, shoe polishes, in rubber compositions, for breaking or demulsifying petroleum emulsions such as those of the water-in-oil type which are encountered in oil-field operations, and with advantage in paints and the like, and for various other purposes which will readily occur to those versed in the art in the light of our disclosure herein.

As detergents, they may in general be dissolved in water or aqueous media and utilized in that form or, in the case of solid products, they may be packaged and sold in such form preferably mixed with diluents. They may also be utilized for commercial cleansing, laundering and washing operations with advantage.

It will be understood that the products of the present invention may be employed for their various purposes either alone or together with lesser or greater quantities of inorganic or organic compounds. Thus, for example, many of them may be employed together with salts such as sodium chloride, alkali metal phosphates including pyrophosphates and tetraphosphates, sodium sulphate, alums, perborates such as sodium perborate, and the like. Many of said products may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophilic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulpho-succinate, dilauryl potassium sulpho-glutarate, lauryl monoethanolamine sulpho-acetate, and the like; sulphuric and sulphonic derivatives of condensation products of alkylolamines and higher fatty acids; reaction products of phosphoric, pyrophosphoric, meta-phosphoric, tetraphosphoric, and polyphosphoric acids with higher molecular weight alcohols; Turkey-red oils; compounds of the type of isopropyl naphthalene sodium sulphonate, and other classes of wetting agents.

It will be understood that the compounds need not be utilized in the pure state. Indeed, in most instances it will be found to be more convenient and commercially desirable to employ them in the form of their reaction mixtures with or without the addition of diluents. It will also be understood that mixtures of any one or more of the reacting constituents may be employed in producing the products hereof and this is particularly the case where commercial supplies of the chemicals are utilized.

The term "higher," as used herein and in the claims to describe carboxylic and fatty acids, alcohols, and the like, will be understood to mean at least six carbon atoms unless otherwise specifically stated.

The term "poly" wherever used herein will be understood to be employed in its usual sense, namely, to denote two or more.

The term "residue," as used throughout the specification and claims, is employed in its ordinarily understood chemical significance. For example, where one carboxyl group of tricarballylic acid is amidified with monoethanolamine and another carboxyl group is esterified with an alcohol, that which remains of the tricarballylic acid molecule, for example

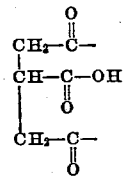

is the residue of the polycarboxylic acid, in this case tricarballylic acid.

What we claim as new and desire to protect by Letters Patent of the United States is:

1. A process of preparing surface modifying agents which comprises providing an amide of a polycarboxylic acid and then introducing into the amide molecule a lipophile group containing at least six carbon atoms and a sulpho-polycarboxylic acid radical.

2. A process of preparing surface modifying agents which comprises reacting a member selected from the group consisting of alcohol primary and secondary amines with a member selected from the group consisting of polycarboxylic acids and esters thereof with alcohols, whereby an amide is produced, then introducing into the molecule of said amide a sulpho-polycarboxylic acid radical and a lipophile group containing at least six carbon atoms.

3. A process of preparing surface modifying agents which comprises providing an amide of a polycarboxylic acid wherein at least two different carboxyl groups of the polycarboxylic acid are amidified by an alcohol amine, and then esterifying said amide with a member selected from the group consisting of carboxylic acids containing at least six carbon atoms and their esters, anhydrides and acyl halides, and replacing the hydrogen of at least one hydroxyl group of said amide with a sulpho-polycarboxylic acid radical.

4. A process of preparing surface modifying agents which comprises reacting a member selected from the group consisting of alcohol primary and secondary amines with an alcohol ester of an aliphatic polycarboxylic acid, whereby an amide is produced, then introducing into the molecule of said amide an aliphatic sulpho-dicarboxylic acid radical containing less than eight carbon atoms and a carboxylic acyl group containing at least six carbon atoms.

5. A process of preparing surface modifying agents which comprises reacting a member selected from the group consisting of alkylol primary and secondary amines with an ethyl ester of a polycarboxylic acid, whereby an amide is produced, then introducing into the molecule of said amide a sulpho-succinic acid radical and a carboxylic acyl group containing from ten to eighteen carbon atoms.

6. The class consisting of higher molecular weight ethers and esters of sulpho-polycarboxylic acid esters of amides of polycarboxylic acids with a member selected from the group consisting of alcohol primary and secondary amines.

7. Hydrophilic higher molecular weight aliphatic carboxylic acid esters of lower molecular weight sulpho-dicarboxylic acid esters of amides of polycarboxylic acids with a member selected from the group consisting of alcohol primary and secondary amines.

8. Higher molecular weight carboxylic acid esters of sulpho-succinic acid esters of amides of polycarboxylic acids with a member selected from the group consisting of alkylol primary and secondary amines.

9. Higher molecular weight fatty acid esters of sulpho-polycarboxylic acid esters of amides of polycarboxylic acids with monoethanolamine.

10. Higher molecular weight fatty acid esters of lower molecular weight aliphatic sulpho-dicarboxylic acid esters of amides of phthalic acid with monoethanolamine.

11. Higher molecular weight fatty acid esters of sulpho-dicarboxylic acid esters of amides of tricarballylic acid with monoethanolamine.

12. Chemical compounds in accordance with the general formula

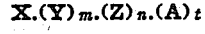

wherein X is the residue of a polycarboxylic acid, Y is the radical of a member selected from the group consisting of alcohol primary and secondary amines, at least one of the carboxyl groups of the polycarboxylic acid being amidified by the alcohol amine, Z is a lipophile group containing at least six carbon atoms, A is a sulpho-polycarboxylic acid radical ester-linked to the alcohol amine radical, and $m$, $n$ and $t$ are each at least one.

13. Chemical compounds in accordance with the general formula

wherein X is the residue of a polycarboxylic acid,

Y is a monoethanolamine radical, at least two of the carboxyl groups of the polycarboxylic acid being amidified by the monoethanolamine, Z is a carboxylic acyl group containing at least six carbon atoms, A is a lower molecular weight aliphatic sulpho-dicarboxylic acid radical ester-linked to a monoethanolamine radical, m is at least two, and n and t are each at least one.

14. Chemical compounds in accordance with the general formula

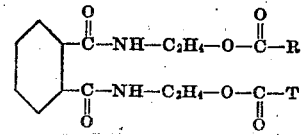

wherein

is a carboxylic acyl radical containing at least six carbon atoms, and

is the carboxylic acyl radical of a sulpho-polycarboxylic acid.

15. Chemical compounds in accordance with the general formula

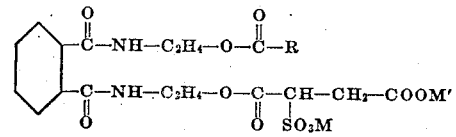

wherein

is an aliphatic carboxylic acyl radical containing from ten to eighteen carbon atoms, and M and M' are cations.

16. Lipophile derivatives of sulpho-polycarboxylic acid amides and esters of water-soluble amides of polycarboxylic acids.

17. Higher molecular weight amides of aliphatic sulpho-dicarboxylic acid amides of water soluble amides of polycarboxylic acids with polyamines.

MORRIS KATZMAN.
BENJAMIN R. HARRIS.